United States Patent
Zigan et al.

(10) Patent No.: US 9,556,778 B2
(45) Date of Patent: Jan. 31, 2017

(54) WASTE HEAT RECOVERY SYSTEM INCLUDING A CLUTCHED FEEDPUMP

(71) Applicant: Cummins Inc., Columbus, IN (US)

(72) Inventors: James A. Zigan, Versailles, IN (US); Andrew P. Perr, Columbus, IN (US); Timothy C. Ernst, Columbus, IN (US)

(73) Assignee: Cummins Inc., Columbus, IN (US)

( * ) Notice: Subject to any disclaimer, the term of this patent is extended or adjusted under 35 U.S.C. 154(b) by 89 days.

(21) Appl. No.: 14/102,095

(22) Filed: Dec. 10, 2013

(65) Prior Publication Data
US 2015/0159535 A1  Jun. 11, 2015

(51) Int. Cl.
| F01N 5/02 | (2006.01) |
| F02G 5/02 | (2006.01) |
| F01K 23/06 | (2006.01) |
| F01K 23/10 | (2006.01) |

(52) U.S. Cl.
CPC ............. *F01N 5/02* (2013.01); *F01K 23/065* (2013.01); *F01K 23/101* (2013.01); *F02G 5/02* (2013.01); *Y02T 10/16* (2013.01); *Y02T 10/166* (2013.01)

(58) Field of Classification Search
CPC ........ F01K 23/065; F01K 23/08; F01K 23/10; F01K 23/12; F01K 23/14
USPC ............................ 60/614–616, 618, 620, 624
See application file for complete search history.

(56) References Cited

U.S. PATENT DOCUMENTS

| 6,581,384 B1* | 6/2003 | Benson | F01K 25/08 60/653 |
| 7,748,226 B2 | 7/2010 | Iwanami et al. | |
| 2002/0007636 A1 | 1/2002 | Hay | |
| 2005/0262858 A1 | 12/2005 | Inaba et al. | |
| 2010/0192574 A1 | 8/2010 | Langson | |
| 2011/0124452 A1* | 5/2011 | Alexander | F03G 7/065 474/139 |
| 2011/0296849 A1 | 12/2011 | Benson | |
| 2011/0308253 A1* | 12/2011 | Ritter | F01K 23/04 60/661 |
| 2012/0192560 A1* | 8/2012 | Ernst | F01K 23/065 60/616 |
| 2012/0210713 A1* | 8/2012 | Ernst | F01N 5/02 60/615 |
| 2013/0061825 A1* | 3/2013 | Borghi | F02M 35/10222 123/184.21 |
| 2013/0074497 A1* | 3/2013 | Mori | F01K 23/10 60/615 |

(Continued)

FOREIGN PATENT DOCUMENTS

JP      2013076370 A  *  4/2013  ............. F01D 15/02

*Primary Examiner* — Thomas Denion
*Assistant Examiner* — Mickey France
(74) *Attorney, Agent, or Firm* — Foley & Lardner LLP (57) ABSTRACT

An engine including a WHR system includes a clutch positioned to engage or disengage a WHR feedpump that moves working fluid through a WHR circuit. The clutch engages or disengages the feedpump under certain operating conditions of the engine and/or the WHR system, and/or at the request of an operator of the engine. Conditions may include cool or cold components, and insufficient working fluid. The operator may also request the clutch be disengaged, such as might be advantageous if the operator detects an operational problem with the WHR system or determines there is an advantage to operating the engine without the WHR system.

17 Claims, 4 Drawing Sheets

(56) References Cited

U.S. PATENT DOCUMENTS

2015/0047351 A1* 2/2015 Ishikawa .................. F02G 5/04
  60/615

* cited by examiner

WASTE HEAT RECOVERY SYSTEM INCLUDING A CLUTCHED FEEDPUMP

TECHNICAL FIELD

This disclosure relates to Waste Heat Recovery (WHR) systems including a feedpump.

BACKGROUND

A WHR system makes use of waste heat from internal combustion engines. The more waste heat energy extracted from an internal combustion engine by a WHR system, the greater the potential efficiency of the engine. However, the WHR system requires energy to operate, such as the energy required to operate a feedpump to pump a working fluid through the WHR system. The energy required to operate the WHR system represents a loss to the efficiency gained from the WHR system.

SUMMARY

This disclosure provides an internal combustion engine, comprising a shaft, a waste heat recovery system, a clutch, and a controller. The waste heat recovery system includes a working fluid circuit, a fluid management system positioned along the working fluid circuit and containing a working fluid, a heat exchange system positioned along the working fluid circuit, a feedpump positioned along the working fluid circuit and operable to move the working fluid through the working fluid circuit, the feedpump driven by the shaft, and an energy conversion system positioned along the working fluid circuit downstream from the heat exchange system and upstream from the fluid management system. The clutch is operable in an engaged position to drivingly connect the shaft to the feedpump and a disengaged positioned to disconnect the shaft from the feedpump. The controller is operable to receive a waste heat recovery command signal, to analyze the waste heat recovery command signal, and to generate and transmit a clutch control signal to the clutch to move the clutch between the engaged position and the disengaged position, based on the waste heat recovery command signal.

This disclosure also provides an internal combustion engine, comprising a shaft, a waste heat recovery system, a clutch, a sensor, and a controller. The waste heat recovery system includes a working fluid circuit, a fluid management system positioned along the working fluid circuit and containing a working fluid, a heat exchange system positioned along the working fluid circuit, a feedpump positioned along the working fluid circuit and operable to move the working fluid through the working fluid circuit, the feedpump driven by the shaft, and an energy conversion system positioned along the working fluid circuit downstream from the heat exchange system and upstream from the fluid management system. The clutch is operable in an engaged position to drivingly connect the shaft to the feedpump, and a disengaged position to disconnect the shaft from the feedpump. The sensor is positioned to measure at least one of a plurality of conditions of the waste heat recovery system including a working fluid temperature upstream from the energy conversion system, a working fluid level, a working fluid pressure upstream from the feedpump, a working fluid pressure downstream from the feedpump, and a heat exchange system outlet fluid temperature; the sensor is configured to transmit a condition signal. The controller is operable to receive the condition signal, to compare the condition signal to a predetermined condition value range, and to transmit a signal to the clutch to move the clutch from the engaged position to the disengaged position if the condition signal is outside the predetermined condition value range.

Advantages and features of the embodiments of this disclosure will become more apparent from the following detailed description of exemplary embodiments when viewed in conjunction with the accompanying drawings.

DETAILED DESCRIPTION

Figure 1:
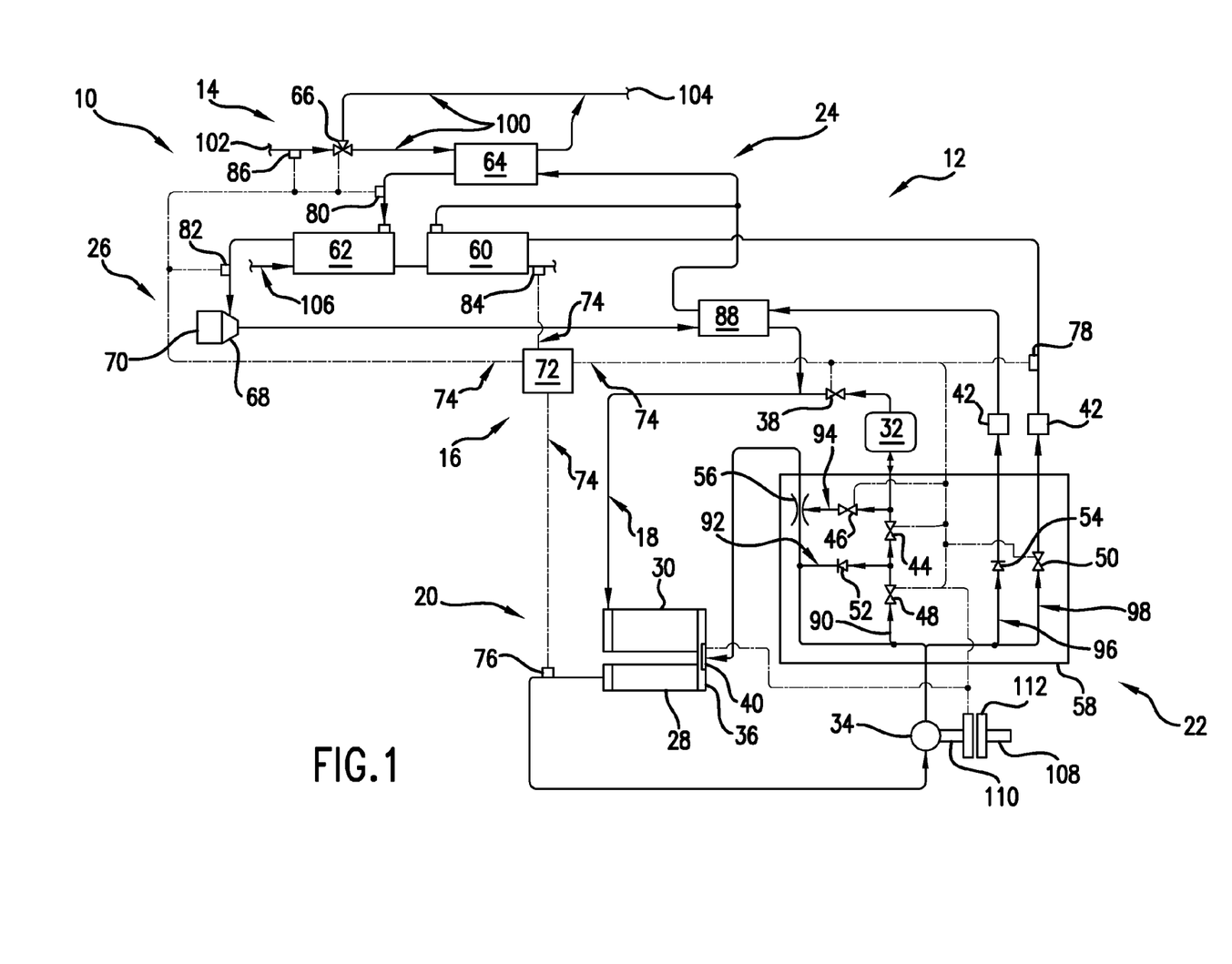
FIG. 1 is a schematic of an internal combustion engine including a WHR system in accordance with an exemplary embodiment of the present disclosure.

Referring now to FIG. 1, a portion of an internal combustion engine in accordance with a first exemplary embodiment of the present disclosure is shown as a schematic and generally indicated at 10. Engine 10 includes a waste heat recovery (WHR) system 12, a portion of an exhaust system 14, and a control system 16. WHR system 12 includes a WHR circuit 18, along which are positioned a fluid management system 20, a fluid control portion 22, a heat exchange system 24, and an energy conversion system 26. Fluid management system 20 provides storage or containment, and cooling for a working fluid of WHR system 12. Fluid control portion 22 regulates the flow of the working fluid throughout WHR system 12. Heat exchange system 24 provides cooling to certain systems of engine 10 and serves to heat the working fluid to permit the working fluid to drive energy conversion system 26, extracting useful work or energy from waste heat created by engine 10.

WHR system 12 includes a feedpump that is operable to move working fluid through WHR circuit 18. Engine 10 includes a clutch that is positioned to engage and disengage the feedpump under certain operating conditions of engine 10, WHR system 12, and/or by the request of an operator of engine 10. For example, if cooling of various components or systems of engine 10 is unnecessary, such as may occur during a startup condition or other conditions where cooling may be undesirable, then the feedpump may be disengaged as needed, and then reengaged when cooling of engine 10 systems or components is advantageous. WHR system 12 may also disengage the feedpump. For example, if working fluid in WHR circuit 18 is insufficient for proper operation of WHR system 12, WHR system 12 may send a signal to request the feedpump be disengaged. The operator may also request the feedpump be disengaged, such as might be advantageous if the operator detects an operational problem with WHR system 12 or determines there is an advantage to operating engine 10 without WHR system 12.

Fluid management system 20 includes a sub-cooler 28, a condenser 30, a receiver 32, and a feedpump 34. Receiver 32 serves primarily as a reservoir for WHR system 12. Condenser 30 serves to convert gaseous working fluid to liquid working fluid. Sub-cooler 28 provides cooling to the liquid working fluid. Condenser 30 may be integral with sub-cooler 28, may connect to sub-cooler 28 by way of WHR circuit 18, or may be commonly mounted with sub-cooler 28 on a common base 36, which may include a plurality of fluid flow paths (not shown) to fluidly connect condenser 30 to sub-cooler 28. Receiver 32 may be physically elevated higher than sub-cooler 28, and may be connected to sub-cooler 28 through fluid control portion 22. The top of receiver 32 includes a vent that may be opened to condenser 30 by way of a vent valve 38. A fluid level sensor 40 is positioned along WHR circuit 18 in a location suitable to determine the level of the liquid working fluid in sub-cooler 28 and condenser 30. In the exemplary embodiment, fluid level sensor 40 is positioned on common base 36. The level of working fluid in WHR system 12 is thus a WHR system condition measured by fluid level sensor 40. Feedpump 34 is positioned along WHR circuit 18 downstream from sub-cooler 28 and upstream from fluid control portion 22. Fluid management system 20 may also include one or more filter driers 42 positioned along WHR circuit 18 downstream from fluid control portion 22. Alternatively, filter drier 42 may be positioned downstream from feedpump 34 and upstream from fluid control portion 22.

Fluid control portion 22 includes a plurality of valves and an ejector 56 configured to regulate flow as needed throughout WHR system 12. Some of the valves receive signals from control system 16 and others are passive valves. The valves include electrically actuated on-off valves 44 and 46, electrically actuated proportional valves 48 and 50, electrically actuated vent valve 38, and passive check valves 52 and 54. Ejector 56 is also a passive device and operates in conjunction with certain valves to draw liquid working fluid from receiver 32. Many of the valves and ejector 56 may be included within a valve module 58. The function of the various valves and ejector 56 is to control the flow of working fluid in WHR system 12, which also controls the heat transferred to and from the working fluid flowing through WHR circuit 18. Though electrically actuated valves 38, 44, 46, 48, and 50 may be described as on-off or proportional valves, this description is for convenience in the context of the exemplary embodiment. The on-off valves may be proportional valves and the proportional valves may be modulated valves capable of opening and closing rapidly to adjust the amount of working fluid flowing through the valves.

In the exemplary embodiment, heat exchange system 24 includes a recuperator 88, an EGR boiler 60, an EGR superheater 62, an exhaust heat exchanger 64, and an exhaust control valve 66. EGR boiler 60 provides the ability to regulate the temperature of an EGR gas by transferring heat from the EGR gas to the working fluid. It should be understood that the term "EGR boiler" is used for the sake of convenience. EGR boiler 60 serves more than one function in engine 10, serving to cool the EGR gas and to transfer heat from the EGR gas to the working fluid of WHR system 12. Exhaust heat exchanger 64 permits the controlled transfer of heat from an engine exhaust gas to the working fluid. The amount of heat available to exhaust heat exchanger 64 is determined by exhaust control valve 66. EGR superheater 62 transfers additional heat energy from the EGR gas to the working fluid, which is in a gaseous state when it enters EGR superheater 62.

Energy conversion system 26 includes an energy conversion device 68 and may include an auxiliary unit 70. Energy conversion system 26 is capable of producing additional work or transferring energy to another device or system. For example, energy conversion system 26 may be a turbine, piston, scroll, screw, or other type of expander device that moves, e.g., rotates, as a result of expanding working fluid vapor to provide additional work. The additional work can be fed in the engine's driveline to supplement the engine's power either mechanically or electrically (e.g., by turning a generator), or it can be used to drive a generator and power electrical devices, a parasitic, or a storage battery (not shown). Alternatively, energy conversion system 26 can be used to transfer energy from one system to another system (e.g., to transfer heat energy from WHR system 12 to a fluid for a heating system). Auxiliary unit 70 may be part of a generator. If auxiliary unit 70 is a generator, it may feed a motor generator that may be part of a hybrid drive system.

Control system 16 may include a control module 72 and a wire harness 74. Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Control system 16 may also include a first pressure sensor 76, which is used to measure a low side pressure condition along WHR circuit 18 upstream from feedpump 34 and which may be used to assist in determining whether sub-cooling of the working fluid in sub-cooler 28 is adequate, and for other purposes. Control system 16 may further include a second pressure sensor 78, which is used to measure a high side pressure condition along WHR circuit 18 downstream from feedpump 34 and upstream from energy conversion system 26. Second pressure sensor 78 is positioned in the location shown in FIG. 1 because the temperature of the working fluid at that location is significantly lower than at other locations downstream of the various heat exchangers positioned along WHR circuit 18. Keeping second pressure sensor 78 in a cooler location is more suitable for the packaging and durability of second pressure sensor 78. Control system 16 may also include fluid level sensor 40 positioned to measure the level of liquid working fluid in sub-cooler 28 and condenser 30. Control system 16 may use condition signals from fluid level sensor 40 to determine whether additional liquid working fluid should be moved between sub-cooler 28/condenser 30 and receiver 32.

Control system 16 may also include a plurality of temperatures sensors, such as temperature sensors 80, 82, 84, and 86 that provide signals indicative of temperature conditions of WHR system 12. First temperature sensor 80 provides condition signals to control system 16 that indicates the amount of heat that has been transferred to the working fluid by recuperator 88, exhaust heat exchanger 64, and EGR boiler 60. Condition signals from second temperature sensor 82 in conjunction with signals from second pressure sensor 78 are used to estimate the amount heat that has been transferred to the working fluid from EGR superheater 62, which is an estimate of superheating of the working fluid at the inlet to energy conversion device 68.

Control system 16 may use condition signals indicative of the temperature of the working fluid from second temperature sensor 80 and third temperature sensor 82 to increase or decrease the heat transferred to the working fluid. Third temperature sensor 84 provides signals to control system 16 indicative of the temperature of EGR gas exiting EGR boiler 60. Control system 16 may use the signals from third temperature sensor 84 to increase or decrease heat transfer to the working fluid to vary cooling of the EGR gas. Signals from fourth temperature sensor 86 to control system 16 indicate the temperature of exhaust gas flowing toward exhaust heat exchanger 64. Control system 16 may use the temperature signals from fourth temperature sensor 86 in conjunction with information from second temperature sensor 80 and third temperature sensor 82 to determine the amount of exhaust gas needed to flow through exhaust heat exchanger 64 to heat the working fluid.

Control module 72 may be an electronic control unit or electronic control module (ECM) that monitors the performance of WHR system 12 or may monitor other conditions of engine 10 or an associated vehicle in which WHR system 12 may be located. Control module 72 may be a single processor, a distributed processor, an electronic equivalent of a processor, or any combination of the aforementioned elements, as well as software, electronic storage, fixed lookup tables and the like. Control module 72 may include a digital or analog circuit. Control module 72 may connect to certain components of engine 10 by wire harness 74, though such connection may be by other means, including a wireless system. For example, control module 72 may connect to and provide control signals to vent valve 38, on-off valve 44, on-off valve 46, proportional valve 48, proportional valve 50, and exhaust control valve 66.

The system described thus far is a Rankine cycle waste heat recovery system, or an organic Rankine cycle if the working fluid is an organic high molecular mass fluid with a liquid-vapor phase change that is lower than the water-steam phase change. Examples of Rankine cycle working fluids, organic and inorganic, include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam.

The location of the aforementioned elements is arranged to obtain the benefits of the present disclosure. Condenser 30 is positioned along WHR circuit 18, upstream from sub-cooler 28 and downstream from energy conversion system 26. As previously noted, condenser 30 may be positioned or located on base plate or common base 36, to which sub-cooler 28 may also be attached. Feedpump 34 is positioned along WHR circuit 18 downstream from sub-cooler 28 and upstream from valve module 58. First pressure sensor 76 is positioned along WHR circuit 18 between sub-cooler 28 and feedpump 34.

Fluid control portion 22 may include a plurality of parallel flow path portions formed along WHR circuit 18 that connect feedpump 34 to various elements of WHR system 12. A first flow path portion 90 connects the downstream side of feedpump 34 to receiver 32. Positioned along first flow path portion 90 between feedpump 34 and receiver 32 is proportional valve 48, which is thus downstream from feedpump 34 and upstream from receiver 32. Positioned along first flow path portion 90 between proportional valve 48 and receiver 32 is on-off valve 44. Though not part of first flow path portion 90, vent valve 38 is positioned along WHR circuit 18 between receiver 32 and condenser 30. The purpose of vent valve 38 is to permit vapor to move into and out from receiver 32 as liquid working fluid is moved out from and into receiver 32 along first flow path portion 90.

A second flow path portion 92 extends from a location along first flow path portion 90 between proportional valve 48 and on-off valve 44 to connect to sub-cooler 28 and condenser 30. In the exemplary embodiment, second flow path portion 92 connects to common base 36, which is fluidly connected to sub-cooler 28 and condenser 30. Passive check valve 52 is positioned along second flow path portion 92, and ejector 56 is positioned along second flow path portion 92 between passive check valve 52 and sub-cooler 28 and/or condenser 30, downstream from passive check valve 52 and upstream from sub-cooler 28 and/or condenser 30. First flow path portion 90 is also connected to second flow path portion 92 by a connection path portion 94, which extends from a location between on-off valve 44 and receiver 32 to ejector 56. On-off valve 46 is positioned along connection path portion 94.

A third flow path portion 96, which is parallel to first flow path portion 90 and to second flow path portion 92, connects feedpump 34 to recuperator 88. Passive check valve 54 is positioned along third flow path portion 96, between feedpump 34 and recuperator 88. Recuperator 88 is connected on a downstream side to exhaust heat exchanger 64. Filter drier 42 may be positioned along WHR circuit 18 between recuperator 88 and passive check valve 54. Recuperator 88 is also positioned along WHR circuit 18 between energy conversion system 26 and condenser 30, downstream from energy conversion system 26 and upstream from condenser 30.

A fourth flow path portion 98, which is parallel to first flow path 90, second flow path portion 92, and third flow path portion 96, connects feedpump 34 to EGR boiler 60. Exhaust heat exchanger 64 is positioned downstream from EGR boiler 60 and recuperator 88, thus any working fluid flow along third flow path portion 96 and working fluid flow along fourth flow path portion 98 converges prior to entry into exhaust heat exchanger 64. Proportional valve 50 is positioned along fourth flow path portion 98 downstream from feedpump 34 and upstream from engine heat exchanger 60. A Filter drier 42 may be positioned along WHR circuit 18 downstream from proportional valve 50 and upstream from EGR boiler 60.

EGR superheater 62 is positioned along WHR circuit 18 downstream from exhaust heat exchanger 64 and upstream from condenser 30. First temperature sensor 80 is positioned along WHR circuit 18 between exhaust heat exchanger 64 and EGR superheater 62. Energy conversion device 68 is positioned along WHR circuit 18 downstream from EGR superheater 62 and upstream from condenser 30. Second temperature sensor 82 is positioned along WHR circuit 18 between EGR superheater 62 and energy conversion device 68.

Exhaust heat exchanger 64 is positioned along an exhaust gas circuit 100. Exhaust gas circuit 100 connects an upstream aftertreatment system 102 to exhaust heat exchanger 64. Exhaust control valve 66 is positioned between aftertreatment system 102 and exhaust heat exchanger 64. Both exhaust control valve 66 and exhaust heat exchanger 64 are connected on their downstream sides by exhaust gas circuit 100 to an atmospheric vent 104, which may be a tailpipe, exhaust pipe, exhaust stack, or the like. Fourth temperature sensor 86 is positioned along exhaust gas circuit 100, upstream from exhaust heat exchanger 64. In the exemplary embodiment, fourth temperature sensor 86 is positioned along exhaust gas circuit 100 upstream from exhaust control valve 66.

EGR superheater 62 and EGR boiler 60 are connected to a portion of an EGR circuit 106. EGR gas flows along EGR circuit 106 into EGR superheater 62 and then downstream from EGR superheater 62 into EGR boiler 60. From EGR boiler 60, EGR gas flows downstream along EGR circuit 106. EGR superheater 62 and EGR boiler 60 serve as heat exchangers for EGR circuit 106, providing a cooling function for the EGR gas flowing through EGR superheater 62 and EGR boiler 60. EGR superheater 62 and EGR boiler 60 also serve as heat exchangers for WHR circuit 18, raising the temperature of working fluid flowing through EGR boiler 60 and through EGR superheater 62. Third temperature sensor 84 is positioned along EGR circuit 106 downstream from EGR boiler 60.

Engine 10 includes a first shaft 108, a second shaft 110, and a clutch 112 that connects first shaft 108 to second shaft 110 when clutch 112 is engaged, and disconnects second shaft 110 from first shaft 108 when clutch 112 is disengaged. Thus, when clutch 112 is engaged, first shaft 108 is drivingly connected to feedpump 34. First shaft 108 is rotatably driven by engine 10, and may be directly driven by an output shaft of engine 10, such as a crankshaft, or indirectly, by way of a belt and pulley arrangement. When clutch 112 is engaged, the rotation of first shaft 108 causes the rotation of second shaft 110. Clutch 112 may be electrically operated, pneumatically operated, hydraulically operated, or may be operated by a combination of electrical, pneumatic and hydraulic systems. Clutch 112 may be operated as an on/off clutch, an infinitely variable clutch that permits controlling the speed of rotation of second shaft 110, or a multiple discrete speed clutch that permits, as an example, high speed rotation, low speed rotation, or an off position where second shaft 110 is disengaged from first shaft 108. Clutch 112 is connected to control system 16 and receives control signals from control system 16 that causes the engagement and disengagement of clutch 112.

WHR system 12 operates as follows. Sub-cooler 28 stores liquid working fluid. Engine 10 drives first shaft 108, causing rotary motion of first shaft 108. When control system 16 sends an engage signal to clutch 112, clutch 112 connects first shaft 108 to second shaft 110, causing first shaft 108 to rotatably drive second shaft 110, which then rotatably drives feedpump 34. The rotary or rotational movement of feedpump 34 pulls or draws liquid working fluid from sub-cooler 28. Feedpump 34 then forces liquid working fluid downstream to valve module 58. In valve module 58, the flow of liquid working fluid may be directed to one of four parallel flow path portions, as directed by control system 16 by way of the valves in valve module 58. First flow path portion 90 connects feedpump 34 to receiver 32. Second flow path portion 92 connects feedpump 34 to condenser 30/sub-cooler 28. Third flow path portion 96 connects feedpump 34 to recuperator 88. Fourth flow path portion 98 connects feedpump 34 to EGR boiler 60.

Liquid working fluid flows along first flow path portion 90 at approximately 17.5 gallons per minute (gpm) at about 15 pounds per square inch differential (psid) when control system 16 sends a command to on-off valve 48 to open. The liquid working fluid then flows into second flow path portion 92, through passive check valve 52, into ejector 56, and then downstream to condenser 28. Liquid working fluid may flow along first flow path portion 90 for several reasons. During normal operation of engine 10, proportional valve 48 is at least partially open to permit liquid working fluid to flow into first flow path portion 90 and then into second flow path portion 92, flowing through passive check valve 54, which may have a cracking or opening pressure of 5 psid, so that liquid working fluid flows through second flow path portion to sub-cooler 28, thus forming a continuous loop of flowing liquid working fluid when check valve 52 opens. The amount of liquid working fluid that flows through proportional valve 48 is determined by the amount of liquid working fluid required through third flow path portion 96 and fourth flow path portion 98. If proportional valve 48 is opened and on/off valve 44 is closed, liquid working fluid flows into first flow path portion 90 into second flow path portion 92, which may be used to prevent two-phase working fluid flow, i.e., liquid and gas, from reaching energy conversion system 26. If on-off valve 44 is opened when proportional valve 48 is opened, on-off valve 46 is closed, and vent valve 38 is opened, the cracking pressure of check valve 52 causes liquid working fluid to flow upwardly along first flow path portion 90 to receiver 32. The flow of fluid into receiver 32 causes the level of liquid working fluid in receiver 32 to increase, and causes the level of liquid working fluid in sub-cooler 28 and/or condenser 30 to decrease. Thus, in this valve configuration feedpump 34 may be connected simultaneously to sub-cooler 28 and to receiver 32.

If on-off valve 46 is open, on-off valve 44 is closed, and vent valve 38 is open while liquid working fluid flows from feedpump 34 along first flow path portion 90 into second flow path portion 92 and then into sub-cooler 28 and/or condenser 30, then receiver 32 is connected to sub-cooler 28 and/or condenser 30 along a portion of WHR circuit 18 that is parallel to the portion of WHR circuit 18 that connects feed pump 34 to sub-cooler 28 and/or condenser 30. In this valve configuration, liquid working fluid will be drawn from receiver 32, flowing through a portion of first flow path portion 90 through on-off valve 46, which is positioned along connection path portion 94, into ejector 56. The liquid working fluid then flows downstream from ejector 56 to sub-cooler 28 and condenser 30, increasing the level of liquid working fluid in sub-cooler 28 or in condenser 30. The level of liquid working fluid may vary sufficiently that condenser 30 may contain some liquid working fluid. The increase in the level of the liquid working fluid in sub-cooler 28 increases sub-cooling, adjusting the saturation temperature of the liquid working fluid. Vent valve 38 is normally open during operation of engine 10, which permits vapor to flow to and from the top portion of receiver 32 to and from a top portion of condenser 30, permitting the level of liquid working fluid in receiver 32 to increase or decrease. Once the level of liquid working fluid has been increased in sub-cooler 28 and/or condenser 30 a desirable amount, on-off valve 46 is closed, stopping flow from receiver 32 through connection path portion 94.

Liquid working fluid flows along third flow path portion 96 based on the opening of proportional valve 50 positioned along fourth flow path portion 98. Passive check valve 54 creates a backpressure along the upstream portion of third flow path portion 96, which biases the flow of liquid working fluid along fourth flow path portion 98. By partially closing proportional valve 50, the backpressure along the upstream portion of fourth flow path portion 98 increases, until passive check valve 54 cracks or opens under the increased backpressure from proportional valve 50. Relatively small amounts of liquid working fluid normally flow through first flow path portion 90 and second flow path portion 92, so most of the liquid working fluid provided to WHR circuit 18 by feedpump 34 flows through third flow path portion 96 and fourth flow path portion 98.

Control system 16 receives signals from first temperature sensor 80 indicative of the temperature of the working fluid prior to entering EGR superheater 62. If the temperature of the working fluid is insufficient for a desired level of superheating by EGR superheater 62, control system 16 may send a control signal to proportional valve 50 to increase flow through fourth flow path portion 98, which increases flow through fourth flow path portion 98 to EGR boiler 60. The increase in the flow of working fluid through EGR boiler 60 causes an increase in heat transfer from EGR circuit 106 to the working fluid. Control system 16 may also receive temperature signals from second temperature sensor 82 indicative of the amount of superheating of the working fluid, which control system 16 may use to adjust the flow of liquid working fluid through third flow path portion 96 and fourth flow path portion 98. Control system 16 may also receive temperature signals from third temperature sensor 84 indicative of the temperature of EGR gas. Because cooling of EGR gas in EGR circuit 106 relates to emissions of engine 10, control system 16 may increase or decrease the flow of working fluid through third flow path portion 96 to decrease or increase cooling of EGR gas to optimize engine emissions.

Flow of working fluid through third flow path portion 96 and fourth flow path portion 98 converges upstream from exhaust heat exchanger 64. Control system 16 is able to selectively direct heat to exhaust heat exchanger 64 by sending control signals to exhaust control valve 66, depending on the temperature signals control system 16 receives from first temperature sensor 80, second temperature sensor 82, and the temperature of exhaust gases, which is indicated by signals from fourth temperature sensor 86. Any exhaust gas that does not flow into exhaust heat exchanger 64 flows around exhaust heat exchanger 64 directly to atmospheric vent 104. Thus, exhaust heat exchanger 64 selectively receives exhaust gas flowing through exhaust system 14 to atmospheric vent 104.

Cooling of exhaust gas in exhaust heat exchanger 64 is an optional function that may be reduced in favor of cooling of EGR gas in EGR boiler 60. Thus, the configuration of these components is advantageous in providing priority cooling to EGR gas. Additional heat may then be added to the working fluid as needed in exhaust heat exchanger 64 and EGR superheater 62 by WHR system 12 to obtain optimal superheating of the working fluid. The working fluid, which is in a gaseous state because of heat transfer from the above-described heat exchangers, flows from exhaust gas heat exchanger 64 into EGR superheater 62, where additional heat energy is added to the gaseous working fluid. The superheated gaseous working fluid flows from EGR superheater 62 into energy conversion device 68.

High-pressure energy conversion device 68 may drive auxiliary unit 70. Auxiliary unit 70 can channel mechanical energy into the driveline (not shown) of engine 10 or can generate electrical energy to power electrical devices or for storage in one or more batteries. If auxiliary unit 70 is an electrical generator, the power could power a driveline motor generator (not shown) by way of power electronics (not shown) to help drive a vehicle (not shown) in which engine 10 is mounted. As the superheated gaseous working fluid flows through energy conversion device 68, the pressure and temperature of the gaseous working fluid decreases significantly prior to flowing along WHR circuit 18 into condenser 30. The decrease in temperature and pressure begins the condensation process, which continues in condenser 30. The working fluid, now in a liquid state, flows to sub-cooler 28, and the process begins again.

Figure 2:
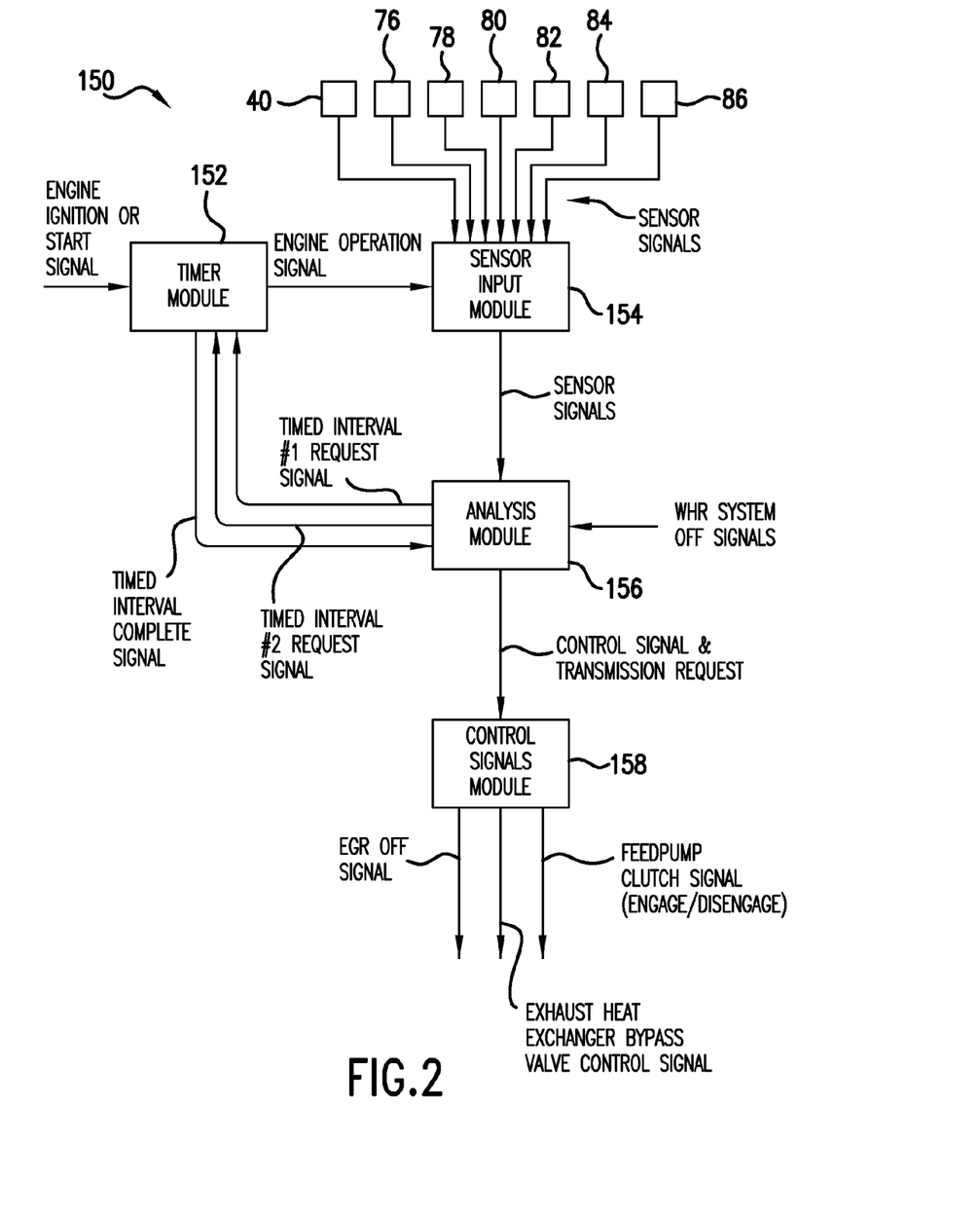
FIG. 2 is a WHR system operation module of the engine of FIG. 1 in accordance with an exemplary embodiment of the present disclosure.

Referring to FIG. 2, a WHR system operation module of engine 10 in accordance with an exemplary embodiment of the present disclosure is shown and generally indicated at 150. WHR system operation module 150 includes a timer module 152, a sensor input module 154, an analysis module 156, and a control signals module 158.

Timer module 152 provides timing functions for WHR system operation module 150, and receives an engine ignition or engine start signal from control system 16, and timing requests from other modules of WHR system operation module 150, such as analysis module 156. Timer module 152 uses the inputs to set a requested interval of time. Once the requested time interval or duration is complete, timer module 152 transmits a signal to the requesting module, or other appropriate module, that the interval is complete. For example, the engine ignition or start signal initiates a predetermined time interval that corresponds to a warm-up period for engine 10. The warm-up period permits the working fluid to be heated, which permits optimum operation of WHR system 12. While the term "predetermined interval" implies a fixed interval, the "predetermined interval" may be related to ambient conditions. For example, if the ambient temperature is 70 degrees Fahrenheit, the predetermined interval may be 10 seconds. In another example, if the ambient temperature is 0 degrees Fahrenheit, the predetermined interval may be 30 seconds. Timer module 152 may also perform timing operations for other portions of WHR system operation module 150, described further hereinbelow. One benefit of the predetermined delay interval is to reduce the possibility of two-phase working fluid flow into energy conversion device 68, which is potentially harmful to energy conversion device 68.

If timer module 152 received the engine ignition or start signal, and the predetermined time interval or duration is complete, then timer module transmits an engine operation signal to sensor input module 154. Once sensor input module 154 receives the engine operation signal, sensor input module 154 begins receiving signals from various sensors positioned on engine 10. In the exemplary embodiment, sensor input module 154 receives signals from fluid level sensor 40, first pressure sensor 76, second pressure sensor 78, first temperature sensor 80, second temperature sensor 82, third temperature sensor 84, and fourth temperature sensor 86. Sensor input module 154 provides the sensor signals to analysis module 156.

Analysis module 156 receives sensor signals from sensor input module 154, WHR system off signals from other modules in control system 20, from an operator request, or from a vehicle or other system in which engine 10 is positioned, mounted, or located. Analysis module 156 analyzes the various signals, as described further hereinbelow, and determines whether control signals need to be transmitted to various portions of WHR system 12. For example, analysis module 156 may request transmission of a signal to stop EGR flow through EGR circuit 106, a signal to engage or disengage clutch 112, and/or a signal to exhaust control valve 66 to bypass exhaust heat exchanger 64. Certain portions of the analysis of signals received by analysis module 156 may require time intervals before proceeding with an analysis or action. In such cases, analysis module 156 may transmit timed interval requests to timer module 152. Such requests may be requests for predetermined time intervals or durations, or analysis module 156 may transmit the required time interval to timer module 152. Once timer module 152 has measured the requested time interval or duration, timer module 152 transmits a timed interval complete signal to analysis module 156.

Control signals module 158 receives requests to transmit signals to one or more components or systems of engine 10 from analysis module 156. Control signals module 158 provides the signals in the proper format to the proper module or bus. In some circumstances, control module 158 includes drivers or amplifiers to condition or modify the signals prior to transmission. In the exemplary embodiment, the signals include an EGR system off signal, an exhaust control valve 66 control signal, and a feedpump clutch 112 engage or disengage signal.

Figure 3:
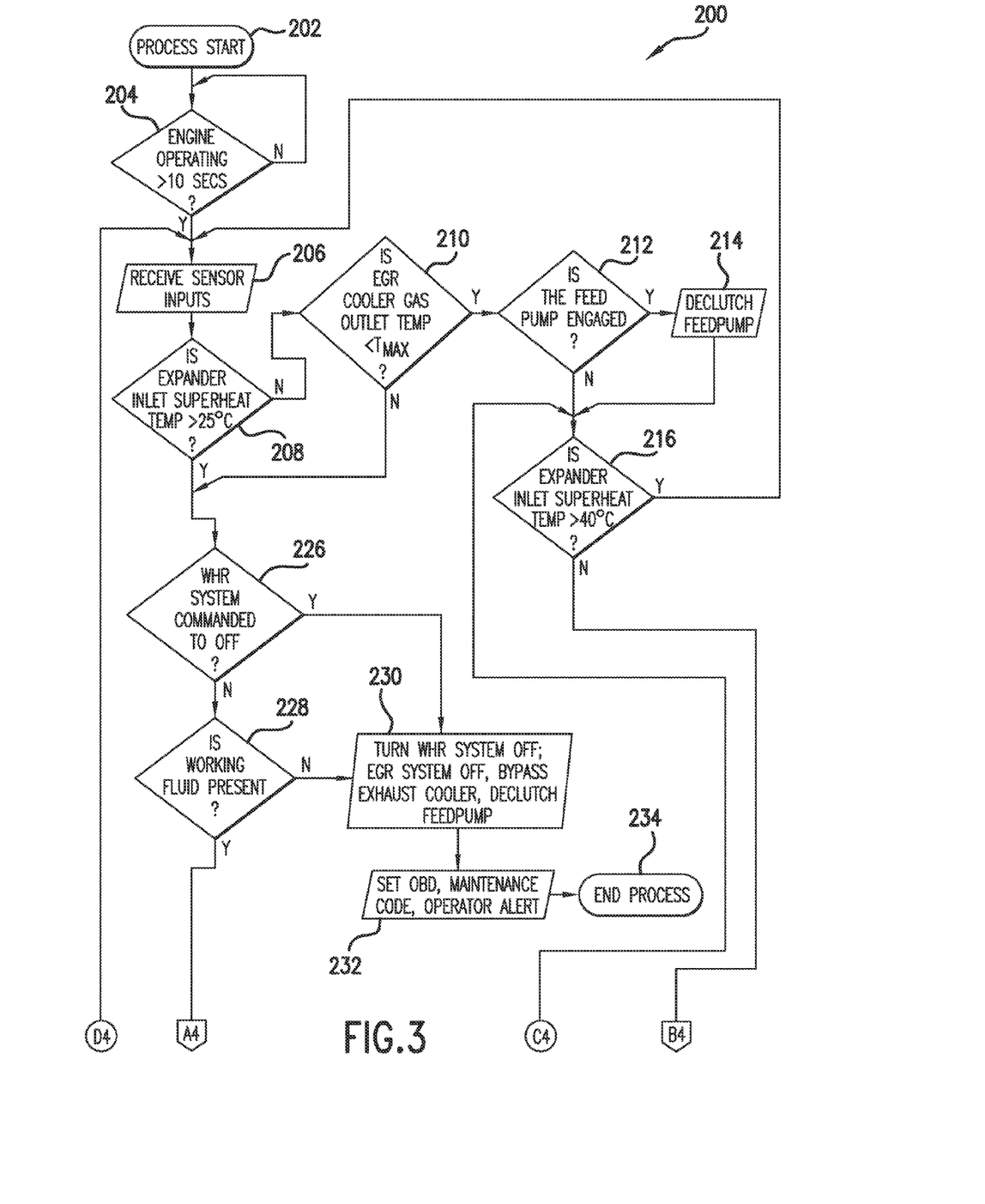
FIG. 3 (continued on sheet 4 as FIG. 3 CONT.) is a WHR process flow diagram of the WHR system operation module of FIG. 2 in accordance with an exemplary embodiment of the present disclosure.

Referring to FIG. 3, a process flow diagram of WHR system operation module 150 in accordance with an exemplary embodiment of the present disclosure is shown and generally indicated at 200. WHR system process 200 may be distributed over various systems, subsystems, assemblies, and components of engine 10. Portions of WHR system process 200 may be located or positioned in control system 16, and may be positioned in one or more of the modules of WHR system operation module 150. Due to the size of process 200, process 200 is continued on a second sheet (FIG. 3 CONT.) Accordingly, A4 is connected with A4, B4 is connected with B4, C4 is connected with C4, and D4 is connected with D4.

WHR system process 200 begins with a process 202, which may begin with an engine ignition or engine start signal. Process 202 transfers control to an engine operating time decision process 204. Engine operating time decision process 204 determines whether engine 10 has been operating for a predetermined or calculated time interval. One benefit to decision process 204 is to permit the systems of engine 10 to generate sufficient heat for transfer and evaporation of the working fluid of WHR system 12. In the exemplary embodiment, the predetermined time interval is 10 seconds. If the time interval has yet to be reached, WHR system process 200 loops back through engine operating time decision process 204 until the predetermined or calculated timer interval has been reached. Once the time interval required by engine operating time decision process has been reached, control passes from engine operating time decision process 204 to a sensor input signal process 206.

Sensor input signal process 206 receives signals from one or more sensors located on engine 10, and in some embodiments, may be located in other locations, such as a vehicle in which vehicle 10 is positioned or mounted. In the exemplary embodiment, sensor input signal process 206 receives signals from fluid level sensor 40, first pressure sensor 76, second pressure sensor 78, first temperature sensor 80, second temperature sensor 82, third temperature sensor 84, and fourth temperature sensor 86. Once signals from various sensors are received, control moves from sensor input signal process 206 to a first expander temperature decision process 208.

In first expander temperature decision process 208, a determination of whether the temperature of working fluid entering energy conversion device 68 is greater than a predetermined superheat temperature is made. As used herein, superheat temperature is defined as the actual/measured temperature minus the saturation temperature at a given pressure (i.e., T(superheat)=T(actual/measured)−T(saturation, at a given pressure)). In the exemplary embodiment, the predetermined temperature is 25 degrees Celsius of superheat above the saturation temperature at the given pressure. In the exemplary embodiment, the temperature of the working fluid is provided by signals from second temperature sensor 82. If the temperature of the working fluid is not greater than the predetermined superheat temperature (e.g., 25 degrees Celsius), control passes from first expander temperature decision process 208 to an EGR cooler outlet temperature decision process 210.

In EGR cooler outlet temperature decision process 210, a determination of whether EGR gas exiting EGR boiler 60 has a temperature that is less than a predetermined temperature $T_{Max}$ is made. In the exemplary embodiment, the temperature of EGR gas or fluid exiting EGR boiler 60 is provided by third temperature sensor 84. If the temperature of the EGR gas is less than $T_{Max}$, control passes from EGR cooler outlet temperature decision process 210 to a feedpump clutch engaged decision process 212.

In feedpump clutch engaged decision process 212, a determination of whether clutch 112 is engaged to drive feedpump 34 is made. If clutch 112 is engaged, control passes to a disengage feedpump clutch process 214, where a signal is transmitted to clutch 112 to disengage or declutch clutch 112. From disengage feedpump clutch process 214, control passes to a second expander temperature decision process 216. Returning to feedpump clutch engaged decision process 212, if clutch 112 is disengaged or declutched, control passes from feedpump clutch engaged decision process 212 to expander temperature decision process 216.

In second expander temperature decision process 216, a determination of whether the temperature of working fluid entering energy conversion device or expander 68 is greater than a predetermined superheat temperature is made. In the exemplary embodiment, the predetermined temperature is 40 degrees Celsius of superheat above the saturation temperature at the given pressure. In the exemplary embodiment, the temperature of the working fluid is provided by signals from second temperature sensor 82. If the temperature of the working fluid is greater than the predetermined superheat temperature, control passes from second expander temperature decision process 216 to sensor input signal process 206, described hereinabove. If the temperature of the working fluid is less than or equal to the predetermined superheat temperature, control passes from second expander temperature decision process 216 to an expander inlet temperature and ΔP process 218.

In expander inlet temperature and ΔP process 218, the temperature of the working fluid flowing into energy conversion device 68 is compared to a predetermined superheat temperature, and the working fluid pressure downstream from feedpump 34 is compared to the working fluid pressure upstream from feedpump 34 to calculate a pressure differential, or ΔP. If the superheat temperature of the working fluid is less than the predetermined superheat temperature for an interval that is greater than one minute, and the pressure difference or ΔP is less than a predetermined pressure difference value, then control passes from expander inlet temperature and ΔP process 218 to an engage feedpump clutch process 220. If the superheat temperature of the working fluid is greater than or equal to the predetermined superheat temperature, or is less than the predetermined superheat temperature for less than one minute, or if ΔP is greater than or equal to the predetermined pressure difference value, then control passes from expander inlet temperature and ΔP process 218 to second expander temperature decision process 216, described hereinabove. In the exemplary embodiment, the predetermined superheat temperature in expander inlet temperature and ΔP process 218 is 25 degrees Celsius of superheat above the saturation temperature at the given pressure and the predetermined ΔP in expander inlet temperature and ΔP process 218 is 20 PSI.

In engage feedpump clutch process 220, a signal is transmitted to clutch 112 to engage clutch 112, which causes feedpump 34 to be rotatably driven by first shaft 108. Control is then passed from engage feedpump clutch process 220 to a first time delay process 222. In first time delay process 222, WHR system process 200 waits for a first predetermined time delay or interval, which in the exemplary embodiment is five seconds. Once the predetermined time delay or interval has passed, control passes from first time delay process 222 to a disengage feedpump clutch process 224, where a signal is transmitted to clutch 112 to disengage clutch 112, which causes feedpump 34 to stop operating. Control then passes from disengage feedpump clutch process 224 to sensor input signal process 206, described hereinabove.

Returning to first expander temperature process 208 and EGR cooler outlet temperature decision process 210, if the temperature of the working fluid flowing into energy conversion device 68 is greater than the predetermined superheat temperature for first expander temperature process 208, which in the exemplary embodiment is 25 degrees Celsius of superheat above the saturation temperature at the given pressure, or if the temperature of the EGR gas exiting EGR boiler 60 is greater than or equal to $T_{Max}$, for the EGR cooler outlet temperature decision process 210, then control passes from either first expander temperature process 208 or EGR cooler outlet temperature decision process 210 to a WHR commanded off decision process 226.

In WHR commanded off decision process 226, a determination of whether WHR system 12 has been commanded to off is made. Signals requesting shutoff of WHR system 12 may be received from a plurality of sources. For example, modules in control system 20 may transmit a request to shutdown WHR system 12 to WHR system process 200, or a system in a vehicle in which engine 10 is located or positioned may request WHR system 12 be shut off, or an operator may request shutoff of WHR system 12. If a request to shutoff WHR system has not been received, control passes to a working fluid presence decision process 228. If a request to shutoff WHR system has been received, control passes from WHR commanded off decision process 226 to an EGR system shutdown process 230.

In working fluid presence decision process 228, a determination of whether sufficient working fluid is present in WHR circuit 18 is made. If there is insufficient working fluid from proper operation of WHR system 12, control passes from working fluid presence decision process 228 to EGR system shutdown process 230. In the exemplary embodiment, the presence of sufficient working fluid may be made from signals received from fluid level sensor 40, and from first pressure sensor 76 and second pressure sensor 78. If insufficient working fluid is present, control passes from working fluid presence decision process 228 to EGR system shutdown process 230.

In EGR system shutdown process 230, signals are transmitted to various systems and components to effectively shut down WHR system 12. In the exemplary embodiment, EGR gas flow through EGR circuit 106 is stopped, exhaust control valve 66 is operated to connect exhaust gas flow from aftertreatment system 102 directly to atmospheric vent 104, bypassing exhaust heat exchanger 64, and a signal is transmitted to clutch 112 to disengage clutch 112, which disconnects first shaft 108 from feedpump 34, which stops the operation of feedpump 34. Control then passes from EGR system shutdown process 230 to an alerts process 232.

Alerts process 232 may set an On-Board Diagnostics (OBD) code or other maintenance code, and may provide an indicator visible to the operator indicating that WHR system 12 is being shut down. Control then passes from alerts process 232 to an end process 234, where WHR system process 200 terminates.

Returning to working fluid presence decision process 228, if sufficient working fluid is present for proper operation of WHR system 12, control passes from working fluid presence decision process 228 to a feedpump engaged process 236. If clutch 112 is not engaged, control passes from feedpump engaged process 236 to an engage feedpump clutch process 238, where a signal is transmitted to clutch 112 to actuate, engaging clutch 112 and causing feedpump 34 to be rotatably driven by first shaft 108. Once the signal to engage or actuate clutch 112 is transmitted to clutch 112, control passes from engage feedpump clutch process 238 to a second time delay process 240. Returning to feedpump engaged process 236, if clutch 112 is actuated or engaged, control passes from feedpump engaged process 236 to second time delay process 240.

In second time delay process 240, WHR system process 200 delays for a predetermined time interval, which in the exemplary embodiment is ten seconds. Once the predetermined interval has passed, control passes from second time delay process 240 to sensor input signal process 206, described hereinabove.

WHR system process 200 is thus configured to use the inputs from various sensors positioned along WHR circuit 18, EGR circuit 106, and other locations, as well as commands from an operator or engine 10, to determine whether clutch 112 should be engaged or disengaged, which thus causes feedpump 34 to either be driven or to stop. Thus, the operation of WHR system 12 is automatically controlled by analyzing various signals and selectively engaging or disengaging clutch 112. By enabling the selective engagement and disengagement of clutch 112, WHR system 12 may be disengaged under certain conditions, thus improving the efficiency of engine 10 by eliminating the need to drive feedpump 34. Furthermore, WHR system 12 may disengaged or turned off when WHR system 12 is unable to be operated efficiently, such as might occur when working fluid is insufficient for proper operation of WHR system 12 or when insufficient waste heat is available for proper operation of WHR system 12. In addition to the other described benefits, the system of the present disclosure reduces the chance of two-phase working fluid flow into energy conversion device 68. The system of the present disclosure may also permit reducing the amount of working fluid needed for proper operation of WHR system 12, since liquid working fluid in various portions of WHR system 12 can be vaporized and moved toward feedpump 34 prior to engaging and driving feedpump 34. By moving the liquid working fluid toward sub-cooler 28, the volume of liquid working fluid available to feedpump 34 is increased prior to operating feedpump 34, which decreases the amount of working fluid needed in WHR circuit 18. Also, by testing the inlet temperature to energy conversion device 68 in combination with other conditions of WHR system 12, excessive flow rate through WHR circuit 18 may be tested. This fluid inventory reduction is realized on system startup, as this is the condition where the 2-phase and liquid lines move downstream into the heat exchangers due to the lack of sufficient heat to boil the working fluid off. The sensors that watch for this are the turbine inlet temperature sensor along with the measured or predicted turbine inlet pressure. The tailpipe boiler outlet temperature is also able to indicate if there is liquid in this region or not. So, in the example above, if the measured superheat is below 25 degrees Celsius (or 40 degrees Celsius for the secondary check), then the pump is turned off. This has the effect of moving the 2-phase line upstream further, which results in a greater volume of gaseous working fluid in the heat exchangers and less liquid volume. With liquid being approximately ten times greater than the density of gas, it is advantageous from a mass basis to have gaseous volume as opposed to liquid volume in the downstream portions of the heat input section.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:
1. An internal combustion engine, comprising:
   a shaft rotatably driven by the engine;
   a waste heat recovery system, including:
      a working fluid circuit;
      a fluid management system including a condenser, a sub-cooler, and a receiver positioned along the working fluid circuit;
      a heat exchange system including a recuperator and an EGR boiler positioned along the working fluid circuit;
      a feedpump positioned along the working fluid circuit and operably driven by the shaft to move a working fluid through the working fluid circuit; and
      an energy conversion system including an expander positioned along the working fluid circuit downstream from the heat exchange system and upstream from the fluid management system;
   a clutch operable in an engaged position to drivingly connect the shaft to the feedpump and a disengaged position to disconnect the shaft from the feedpump; and
   a controller operable to receive a waste heat recovery command signal, and to generate and transmit a clutch control signal to the clutch to move the clutch between the engaged position and the disengaged position, based on the waste heat recovery command signal, wherein at the engaged position, the controller selectively places the feedpump in connection to at least one of the receiver through a first flow path, the sub-cooler through a second flow path, the recuperator through a third flow path, and the EGR boiler through a fourth flow path based on the waste heat recovery command signal,
   wherein the controller, based on a length of time interval for which the engine has been operating, controls the engaged or disengaged position of the clutch and which flow path from the first, second, third, and fourth flow paths to connect the feedpump at the engaged position of the clutch to prevent a two-phase working fluid flow from reaching the energy conversion system.

2. The internal combustion engine of claim 1, wherein the waste heat recovery command signal is a waste heat recovery off signal.

3. The internal combustion engine of claim 2, wherein the waste heat recovery off signal is one of a waste heat recovery system off signal, a vehicle off signal, and an operator off signal.

4. The internal combustion engine of claim 1, the internal combustion engine further including a working fluid temperature sensor positioned along the working fluid circuit and the waste heat recovery command signal is a working fluid temperature signal transmitted by the working fluid temperature sensor.

5. The internal combustion engine of claim 4, wherein the working fluid temperature sensor is positioned along the working fluid circuit downstream from the heat exchange system and upstream from the energy conversion system.

6. The internal combustion engine of claim 1, further including an EGR circuit and an EGR circuit temperature sensor, the heat exchange system further including an EGR heat exchanger positioned along the EGR circuit and the working fluid circuit, and the EGR circuit temperature sensor positioned along the EGR circuit downstream from the EGR heat exchanger, and the waste heat recovery command signal is an EGR circuit temperature signal transmitted by the EGR circuit temperature sensor.

7. The internal combustion engine of claim 1, wherein the waste heat recovery command signal is a fluid level signal transmitted by a fluid level sensor positioned along the working fluid circuit.

8. The internal combustion engine of claim 7, wherein the fluid level sensor is positioned on the fluid management system.

9. The internal combustion engine of claim 1, wherein the waste heat recovery command signal is a plurality of pressure signals transmitted by a plurality of pressure sensors positioned along the working fluid circuit.

10. The internal combustion engine of claim 9, wherein one of the plurality of pressure sensors is positioned upstream from the feedpump, and one of the plurality of pressure sensors is positioned downstream from the feedpump.

11. The internal combustion engine of claim 1, wherein the heat exchange system further includes an EGR superheater.

12. An internal combustion engine, comprising:
a shaft rotatably driven by the engine;
a waste heat recovery system, including:
  a working fluid circuit;
  a fluid management system including a condenser, a sub-cooler, and a receiver positioned along the working fluid circuit;
  a heat exchange system including a recuperator and an EGR boiler positioned along the working fluid circuit;
  a feedpump positioned along the working fluid circuit and operably driven by the shaft to move a working fluid through the working fluid circuit, and
  an energy conversion system including an expander positioned along the working fluid circuit downstream from the heat exchange system and upstream from the fluid management system;
a clutch operable in an engaged position to drivingly connect the shaft to the feedpump, and a disengaged position to disconnect the shaft from the feedpump;
a sensor positioned to measure at least one of a plurality of conditions of the waste heat recovery system including a working fluid temperature upstream from the energy conversion system, a working fluid level, a working fluid pressure upstream from the feedpump, a working fluid pressure downstream from the feedpump, and a heat exchange system outlet fluid temperature, the sensor configured to transmit a condition signal; and
a controller operable to receive the condition signal, to compare the condition signal to a predetermined condition value range, and to transmit a signal to the clutch to move the clutch from the engaged position to the disengaged position if the condition signal is outside the predetermined condition value range, wherein at the engaged position, the controller selectively places the feedpump in connection to at least one of the receiver through a first flow path, the sub-cooler through a second flow path, the recuperator through a third flow path, and the EGR boiler through a fourth flow path based on the waste heat recovery command signal, wherein the controller, based on a length of time interval for which the engine has been operating, controls the engaged or disengaged position of the clutch and which flow path from the first, second, third, and fourth flow paths to connect the feedpump at the engaged position of the clutch to prevent a two-phase working fluid flow from reaching the energy conversion system.

13. The internal combustion engine of claim 12, further including an EGR circuit, the heat exchange system further including an EGR heat exchanger positioned along the EGR circuit and the working fluid circuit, and the sensor is positioned to measure the EGR circuit temperature downstream from the EGR heat exchanger.

14. The internal combustion engine of claim 13, wherein the EGR heat exchanger further includes an EGR superheater.

15. The internal combustion engine of claim 12, wherein the sensor is a fluid level sensor positioned on the fluid management system.

16. The internal combustion engine of claim 1, wherein at the engaged position, the feedpump is in connection and drives the working fluid to the receiver and the sub-cooler during normal operation of the engine.

17. The internal combustion engine of claim 1, wherein at the engaged position, the feedpump is in connection and drives the working fluid to the EGR boiler if a temperature of the working fluid is lower than a predetermined level.

* * * * *

UNITED STATES PATENT AND TRADEMARK OFFICE
CERTIFICATE OF CORRECTION

Page 1 of 1

PATENT NO. : 9,556,778 B2
APPLICATION NO. : 14/102095
DATED : January 31, 2017
INVENTOR(S) : James A. Zigan et al.

It is certified that error appears in the above-identified patent and that said Letters Patent is hereby corrected as shown below:

In the Specification

Column 1, just before the TECHNICAL FIELD section, please add the following heading and paragraph:
-- STATEMENT REGARDING FEDERALLY SPONSORED RESEARCH OR DEVELOPMENT
This invention was made with government support under "Recovery Act - System Level Demonstration of Highly Efficient and Clean, Diesel Powered Class 8 Trucks (Supertruck)," Program Award Number DE-EE0003403 awarded by the Department of Energy (DOE). The government has certain rights in the invention. --

Signed and Sealed this
Second Day of July, 2019

Andrei Iancu
*Director of the United States Patent and Trademark Office*